No. 744,053. PATENTED NOV. 17, 1903.
J. LE C. DAVIS.
DEVICE FOR ALTERNATING CURRENT MOTOR CONTROL.
APPLICATION FILED JULY 22, 1903.
NO MODEL.

WITNESSES:
Erving R. Gurney
Helen Orford

INVENTOR.
Joseph L. C. Davis,
BY Albert G. Davis
ATTORNEY.

No. 744,053. Patented November 17, 1903.

UNITED STATES PATENT OFFICE.

JOSEPH LE CONTE DAVIS, OF SCHENECTADY, NEW YORK, ASSIGNOR TO GENERAL ELECTRIC COMPANY, A CORPORATION OF NEW YORK.

DEVICE FOR ALTERNATING-CURRENT-MOTOR CONTROL.

SPECIFICATION forming part of Letters Patent No. 744,053, dated November 17, 1903.

Application filed July 22, 1903. Serial No. 166,570. (No model.)

*To all whom it may concern:*

Be it known that I, JOSEPH LE CONTE DAVIS, a citizen of the United States, residing at Schenectady, in the county of Schenectady and State of New York, have invented certain new and useful Improvements in Devices for Alternating-Current-Motor Control, of which the following is a specification.

My invention relates to the control of alternating-current motors; and its object is to provide means for the operation of such motors at any speed and for obtaining a uniform acceleration from rest to full speed with maximum torque over the entire range. Furthermore, by means of my invention phase compensation can be obtained, so that the motors will operate at a high-power factor throughout their entire range of speed. Furthermore, my invention is adapted to the control of a number of motors from one point, and therefore is especially suited to the control of a plurality of motors on the several cars of a train.

Figure 1:
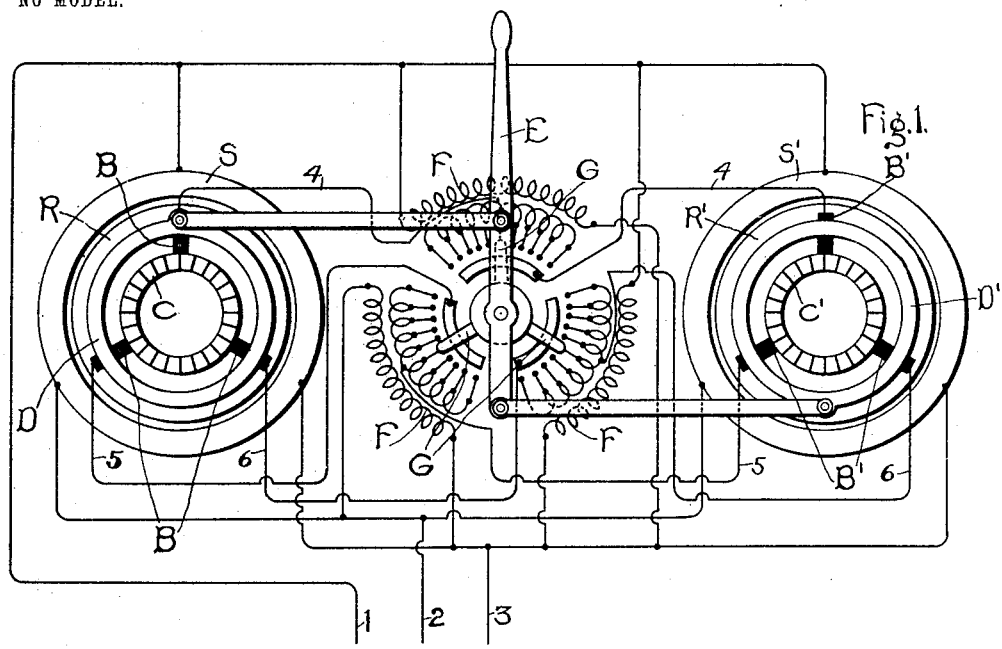
Figure 2:
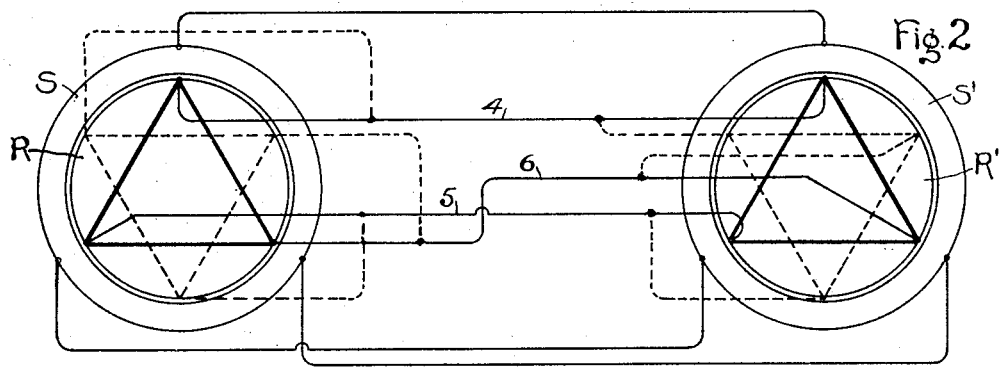
Figure 3:
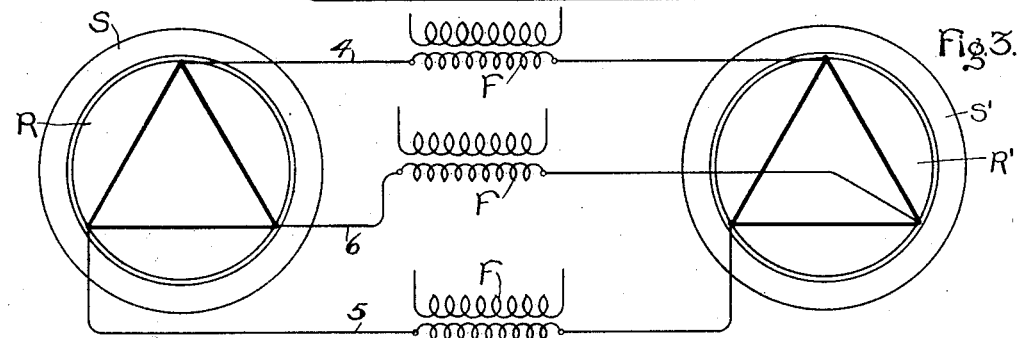

Referring to the drawings, Figure 1 shows an arrangement embodying my invention, and Figs. 2 and 3 are explanatory diagrams of the same.

Referring first to Fig. 2, S S' represent the stators of two alternating-current motors. The motors are shown as of the three-phase type; but my invention is not limited to any particular number of phases. It is applicable to motors of single phase or of any number of phases. The stators S S' are excited from the leads 1, 2, and 3. R R' represent the rotors of the two motors. Three-phase taps are led off from each rotor, and the two rotors are connected by the secondary leads 4, 5, and 6. If the motors are symmetrical in winding and if the rotors are similarly placed, with the rotor-taps occupying the same relative positions as indicated by the full-line triangles in Fig. 2, it is evident that the electromotive force generated in each phase of each motor will be opposed in the secondary leads 4 5 6 by an equal and opposite electromotive force generated by the rotor of the other motor. Consequently no current can flow, and there will be no tendency for the motors to turn. If, now, either of the rotors is displaced, as indicated by the dotted triangles in Fig. 2, the electromotive force generated in the different phases of the different motors will be no longer equal and opposite and a strong synchronizing-current will flow between the rotors, which will tend to restore the rotors to the same relative positions. It is evident that if the contact-points of the rotors could be maintained stationary in space, with one rotor displaced relative to the other, a constant torque would be developed and the rotors would revolve at a certain speed, dependent upon the load. This object would be attained by means of a commutator and brushes. If each rotor is supplied with a commutator, the contact-points will be fixed by the position of the brushes, and by displacing the two sets of brushes relatively to each other a constant torque will be obtained. It is evident that the direction of rotation of the motors will depend upon the direction in which the brushes are relatively displaced. Furthermore, the amount of synchronizing-current and consequent torque will depend upon the amount of relative displacement of the brushes. Thus the direction of rotation and the amount of torque, and consequently the speed, may be controlled by the shifting of the brushes. It is evident, however, that one of the rotors will revolve in the opposite direction to that of the rotating field, while the other rotor will revolve in the same direction as its rotating field. The voltages developed in the two rotors will therefore be unequal, and a wattless magnetizing-current will flow between the rotors in addition to the synchronizing-current. This magnetizing-current reacting on the primary currents in the stators will produce a distortion of the phase of the primary currents; but if the amount and phase of current-flow between the two motors is properly controlled the reaction of the rotor-currents upon the primaries may be made to diminish the magnetizing-current of the primaries, and consequently to increase the power factor at which the system operates. Fig. 3 shows diagrammatically the means for thus controlling the current flowing between the rotors. If the rotors are symmetrically disposed, as before, equal voltages will be developed and no current can flow in the secondary leads 4 5 6 due to the rotor voltages. If, however, boosters F F F are inserted in the secondary leads 4 5 6 and are excited, it is evident that current will flow through the rotors in relatively opposite directions in the two and that rotation will be produced in the same directions as if the brushes had been shifted. The torque, and consequently the speed, will depend upon the amount of the booster voltage.

I thus have two means of controlling the speed of the rotors and the current-flow between them. By properly proportioning the booster voltage and the relative shifting of the brushes I am able to obtain not only a gradual acceleration in speed with large torque, but also compensation for the primary magnetizing-current. Such an arrangement is shown in Fig. 1. S S' represent the stators and R R' the rotors of the two motors. Carried by the rotors are the commutators C C', on which bear the two sets of brushes B B and B' B'. The two sets of brushes are connected by the secondary leads 4 5 6. D D' represent the holders for brushes B B'. These holders are rotatably mounted as regards commutators C C'. E is a lever by means of which the brush-holders and brushes may be relatively shifted. G G G represent switches actuated by the movement of lever E and adapted to vary the excitation of the boosting-coils F F F. The operation of this arrangement will be evident from the foregoing explanation. It is not necessary that both stators should be excited from the mains. One stator may be short-circuited on itself and receive its exciting current from its rotor. It is obvious that either stator or rotor may be provided with a commutator and receive the varying voltages. The use of stator and rotor interchangeably is well known in the art. Such modification requires no additional explanation by illustration.

Obviously the boosting-coils for a number of sets of motors may be connected in series or in parallel and their excitation controlled from one point. Furthermore, the levers of a number of pairs of motors may be operated synchronously from one point by means of any well-known form of apparatus adapted for synchronous movement. Many forms of such devices are well known in the art and require no description here. Thus my invention is particularly applicable to alternating-current train control.

I do not desire to limit myself to the particular construction and arrangement of parts here shown, since changes therein which do not depart from the spirit of my invention and which are within the scope of the appended claims will be obvious to those skilled in the art.

What I claim as new, and desire to secure by Letters Patent of the United States, is—

1. In combination, two alternating-current motors, the winding of one member of each of said motors being supplied with a commutator, a closed circuit including said windings, and means for producing in said circuit a current varying simultaneously in magnitude and phase.

2. In combination, two alternating-current motors, the winding of one member of each motor being supplied with a commutator, a closed circuit including said windings, and means for controlling the amount and phase of the current in said circuit.

3. In combination, two motors, means for producing a varying magnetic flux in one member of each motor, a commutator carried by the other member of each motor, a set of brushes bearing on each commutator, leads connecting said sets, means for shifting one set relative to the other, and means for producing variable voltages in said leads.

4. In combination, two alternating-current motors, of the commutator type, leads connecting the brushes on one motor to the brushes of the other motor, means for producing variable voltages in said leads, and means for shifting the brushes of said motors.

5. In combination, two alternating-current motors, a commutator for each motor, a set of brushes bearing on each commutator, leads connecting said sets, a brush-shifting device, and means for producing variable voltages in said leads.

6. In combination, two alternating-current motors, a commutator for each motor, a set of brushes bearing on each commutator, leads connecting said sets, a brush-shifting device, and booster-coils inserted in said leads.

7. In combination, two alternating-current motors of the commutator type, leads connecting the brushes of one motor to the brushes of the other motor, booster-coils in said leads, and a brush-shifting device.

8. In combination, two alternating-current motors of the commutator type, means for producing a varying magnetic flux in one member of each motor, a closed circuit including the windings of the other members of said motors, and means for controlling the amount and phase of the current in said circuit.

9. In combination, two alternating-current motors having commutators and brushes, leads connecting like brushes of the two motors, means for relatively displacing the brushes of one motor, and means for controlling the amount and phase of the current in said leads.

10. In combination, two alternating-current motors having commutators and brushes, leads connecting like brushes of the two motors, and means for producing in said leads currents varying simultaneously in magnitude and phase.

In witness whereof I have hereunto set my hand this 20th day of July, 1903.

JOSEPH LE CONTE DAVIS.

Witnesses:
 BENJAMIN B. HULL,
 HELEN ORFORD.